3,416,935
INSULATING REFRACTORIES
Edward Einstein and Donald Orr McCreight, Bethel Park, Pa., assignors to Dresser Industries, Inc., a corporation of Delaware
No Drawing. Continuation-in-part of application Ser. No. 397,020, Sept. 16, 1964. This application July 2, 1965, Ser. No. 469,352
1 Claim. (Cl. 106—41)

ABSTRACT OF THE DISCLOSURE

Fired lightweight porous refractory insulating shape analyzing at least about 95% $Al_2O_3$, free of glassy and vitrified phases, being very porous and permeable.

---

This invention is a continuation-in-part of copending application Ser. No. 397,020, now abandoned, which in turn was a continuation of copending application Ser. No. 185,877, now Patent 3,176,054, and claims subject matter disclosed but not claimed in that application and patent.

This invention relates to insulating refractories and more particularly to lightweight, porous, refractory insulating materials and methods of manufacture therefor.

It has been well known and understood in the art that various combustibles can be mixed with unfired refractory material so that, after forming and firing, a porous skeletal structure, for use as a refractory insulation, will result. The combustibles have included various organic materials both naturally occuring and synthetic. Diatomaceous earth, gas developing materials and foaming agents, fly ash, asbestos, exfoliated pyrophyllite, mica, and the like have also been suggested and utilized in forming a low density, lightweight refractory insulation material.

The art is well developed in using the foregoing materials in combination with fireclay and the like, and the insulating products which resulted have been satisfactory in many installations despite problems of friability, cracking, and incomplete burnout of combustible materials, which sometimes later reacted with process exudate in actual metallurgical installations.

It has been suggested, recently, that one manner increasing the solidity of lightweight, porous fireclay refractory insulating materials would be to use compressible, blown or foamed plastics.

In a very comprehensive article reviewing the art of making insulating refractories, by H. Oliver, "The Development of Insulating Bricks for Furnace Construction," Ceramics, a symposium, p. 610, British Ceramic Society (1953) the various fireclay insulating brick manufacturing methods are classified:

"For the production of insulating bricks incorporating combustibles there are three methods of forming or shaping: (1) slop or hand molding, (2) extrusion method, (3) semi-dry or pressing method. Each of these has its advantages and disadvantages, which will be mentioned later."

The slop molding method is characterized by the article as having "extra wetness."

However, the art apparently has not recognized a method of successfully fabricating a high purity alumina refractory insulation. The various combustibles and other materials, which have been incorporated with fireclay and the like, do not appear compatible with high purity alumina to produce a satisfactory refractory insulation. For the most part, this is because of residual inclusions which are difficult to remove after an insulating shape has been formed. The residual inclusions are apparently the result of the mass of material which must be used in the original forming, in order to obtain the low density porous structure which is desired in a refractory insulation.

Accordingly, it is an object of this invention to provide an improved refractory insulation. It is still another object of this invention to provide a lightweight, porous, permeable, high purity alumina refractory insulation, exhibiting good solidity and handleability with incident ease of packaging and transportation.

In one embodiment, a preferred method, of fabricating the insulation refractory material of this invention, includes mixing a quantity of −325 mesh (Tyler) high purity alumina and a quantity of hollow, spherical, expanded, rigid or self-sustaining plastic beads in a selected brickmaking graded size range. The shape should analyze at least 95%, by weight, $Al_2O_3$. The mixture is preferably blended with water to provide a uniform, smooth, heavy, substantially nonflowing cream-like material. This material is placed in molds and machine vibrated to orient the rigid plastic beads. This forming method is a variation of slop molding. The molded material is subjected to a carefully controlled burn including an initial rapid heat to 1700° F. The atmosphere of this 1700° F. heat is lean in oxygen (reducing), whereby the plastic beads are caused to char slowly. The burn is continued at 3000° F. until the charred beads are gasified without disruptions or cracking of the molded material. This 3000° F. burn need not be in a nonoxidizing atmosphere. On a laboratory scale test the 3000° F. burn was for 5 hours.

Preferably, the initial 1700° F. heat is completed in about one hour, but the actual time is controlled by the size of the molded shape, etc. The molds, which are used for forming the shapes to be fired, are preferably moisture-absorbent and may be such as cardboard or plaster.

Insulating refractory, which resulted from the foregoing treatment steps, had a thermal conductivity or K factor of about 3 to 4 B.t.u./ft.$^2$/° F. difference for 1″ thickness. The shapes were strong and substantially uniform textured, and did not exhibit cracking or spalling. In actual testing, samples exhibited a cold crushing strength of upwards of 1050 p.s.i. The product, which resulted, was substantially entirely high purity alumina with no apparent residual plastic bead being entrapped.

The resulting product is very porous and permeable, being characterized as a rigid skeletal structure of refractory defining a mass of interconnected voids. The size and number of voids are controlled by the outer dimensions and number of beads which have been burned out plus the volume of tempering water. This is a well understood principle: The article reviewing the prior art quoted above describing the slop molding method explains:

"In general, when equivalent proportions of combustibles are used, the slop mold process results in a material with a lower bulk density than is produced by the other two methods."

It is, thus, not a homogeneous system. It is free of glassy or vitrified phases. It is so permeable that, when placed in water, it rapidly absorbs water and sinks.

The following table is indicative of actual laboratory testing of comparative mixes according to the concepts of his invention.

TABLE I

| Mix Number | C3 | C4 | C5 | C6 |
|---|---|---|---|---|
| Mix, percent: | | | | |
| −325 mesh (Tyler), 95+% purity alumina | 58.1 | 63.3 | 67.5 | 63.6 |
| Expandable Polystyrene Beads (for our uses these were expanded; −10 on 20 mesh (Tyler) to a density of 2–4 p.c.f.) | 7.0 | 7.6 | 8.2 | 7.6 |
| Nonexpandable Polystyrene Beads: | | | | |
| 8X | | | 8.1 | 9.6 |
| 60 mesh (Tyler) | 29.1 | 22.8 | 8.1 | 9.6 |
| 100 mesh (Tyler) | | | 8.1 | 9.6 |
| Calcium Aluminate Cement [1] | 5.8 | 6.3 | | |
| | 100.0 | 100.0 | 100.0 | 100.0 |
| Lignin Liquor [2] | 6.0 | 6.3 | 6.7 | 6.4 |
| 35% solution of an organic salt in H$_2$O (used as a dispersing agent) [3] | 1.7 | 1.9 | 2.0 | 1.9 |
| Water | 34.0 | 38.0 | 37.0 | 28.0 |
| "SS Glass," a sodium silicate of the Philadelphia Quartz Company (slow solution), Soda/silica ratio 1/3.22 | | | .34 | |
| "GD Silicate," a sodium silicate of the Philadelphia Quartz Company (fast solution), Soda/silica ratio 1/2.00 | | | | .32 |
| Burn | | | 3,000° F. burn, 5 hr. hold, reducing conditions to 1,700° F. | | |
| Bulk Density, p.c.f. | 30 | 30 | 43 | 39 |
| Cold Crushing Strength, p.s.i. | 280 | 180 | 1,050 | 600 |

[1] Such as "Rolandschuette," 52% alumina, less than 1% iron oxide, trace impurities, the remainder analyzing SiO$^2$ and CaO on an oxide basis.
[2] Waste liquor of paper industry, used as a tempering fluid.
[3] Such as "Darvan #7" of the R. T. Vanderbilt Company.

The foregoing tests indicated the important nature of proper combinations of graded ranges for the plastic beads. Note, for instance, the relatively low strength of Mixes 3 and 4 as compared to Mixes 5 and 6. Therefore, additional tests were undertaken studying the importance of (1) a graded sizes range for the plastic beads and (2) the sodium silicate additions. The results of these additional tests are set forth in Table II below:

TABLE II

| Mix Number | C7 | C8 | C9 | C10 | C11 |
|---|---|---|---|---|---|
| Mix, percent: | | | | | |
| Lightly calcined high purity 95+% Al$^2$O$^3$, −325 mesh (Tyler) | 71.0 | 68.0 | 71.0 | 66.0 | 66 |
| Expandable Polystyrene Beads (for our use these were expanded to a density of 2–4 p.c.f.) | 4.4 | 8.3 | 4.4 | 4.0 | 4 |
| Nonexpandable Polystyrene Beads | 24.6 | 23.7 | 24.6 | 30.0 | 30 |
| | 100.0 | 100.0 | 100.0 | 100.0 | 100 |
| Lignin Liquor [1] | 7 | 7 | 7 | 7 | 7 |
| 35% solution of an organic sodium salt in H$^2$O (used as a dispersing agent) [2] | 2 | 2 | 2 | 2 | 2 |
| Water | 37.0 | 35.6 | 37 | 34.5 | 34.5 |
| "GD Silicate," a sodium silicate of the Philadelphia Quartz Company (fast solution), Soda/silica ratio 1/2.00 | | | 0.07 | 0.07 | 0.07 |
| Mold | | Cardboard | | | Plaster |
| Burn | | | 3,000° F., 5 hr. hold, reducing atmosphere to 1,700° F. | | |
| Bulk Density, p.c.f. | 39 | 32 | 42 | 43 | 37 |
| Cold Crushing Strength on Flat, p.s.i. | 535 | 305 | 590 | 640 | 485 |

[1] Waste liquor of paper industry, used as a tempering fluid.
[2] Such as "Darvan #7" of the R. T. Vanderbilt Company.

In the tests of Table II, the expandable polystyrene beads were in the range of 10 on 20 mesh (Tyler), and were substantially all hollow. A workable size range is −4 on 35 mesh (Tyler). The nonexpandable polystyrene beads used in our tests were −28 +100 to 150 mesh (Tyler). While the finer nonexpandable beads were not hollow, the coarser ones were.

In the exemplary laboratory data set forth above, we mention polystyrene beads as beads usable according to the concepts of this invention. It should be understood that other plastic materials in bead form can be utilized. However, any selected bead material must be substantially rigid, must be in a good, graded brickmaking size range, to provide the necessary aggregate base for the very finely divided high purity alumina so that it may be molded and cast. The beads which are used should substantially all be spherical and hollow. The spherical shape and hollowness are important aspects of the successful practice of our invention, in that a large surface area is presented with but little weight, assuring ease of complete removal of the bead material and to provide substantially uniform distribution of pores upon firing. Of course, the pores vary in size according to what size bead was burned out to form it. As noted above, some of the finer beads were not hollow. These solid beads should be kept to a minimum, and in the finer size ranges to be tolerable, in order to assure complete removal on firing.

In the laboratory data above, we discuss a mixture of expandable and expanded beads. However, it should be understood that the expandable beads, before mixing with the alumina, have been pre-expanded to produce a stable rigid structural entity.

The expanded beads, which are substantially all hollow, provide about 60 to 70% of the volume of the mix. The other 40 to 30% is made up of the nonexpandable beads, tempering fluid, the alumina, and sodium silicate.

As discussed above, the initial 1700° F. firing should be relatively rapid. This is because of the very finely divided state of the alumina and the propensity of the skeletal structure, which results after charring out of the beads to crumble if disturbed. However, by continuing the 1700° F. burn with a 3000° F. burn for about five more hours, the high purity alumina skeletal structure is solidified to produce an insulating refractory of good strength.

The relatively high water content in the initial mix is also important to the successful practice of our invention. It is preferable to add sufficient water to provide a quantity of free water in the mix for molding. The free water is, in essence, a lubricant which provides fluidity to the otherwise nonflowable mix. Also, the free water assists in allowing more uniform particle orientation during the vibration step of the molding. However, we have fabricated satisfactory insulating refractory from a mixture, which was dried after mixing and forming but before firing.

Having thus described the invention in detail and with sufficient particularity as to enable those skilled in the art to practice it, what is desired to have protected by Letters Patent is set for in the following claim.

We claim:

1. A fired lightweight porous refractory insulating shape analyzing at least about 95%, by weight Al$_2$O$_3$, said shape being made from a batch consisting essentially of −325 mesh high alumina refractory grain and a mixture of charrable bead-like material, the refractory constituting the major portion by weight of the batch, the bead-like material consisting essentially of a mixture of relatively coarse and relatively fine beads, the relatively coarse beads being −4 +35 mesh and constituting 60 to 70% of the total volume of the batch, the finer bead-like material being −28 +150 mesh, there being sufficient −28 +150 mesh beads to provide a refractory brickmaking graded size range of material when mixed with the −325 mesh refractory and the coarser beads, said shape being characterized as a skeletal refractory network defining a mass of interconnected voids, the number and size of the voids being controlled by the number of pieces of bead-like material and of substantially identical size as the beads, plus the volume of tempering agent, the shape being further characterized as nonhomogeneous due to the size gradation of voids, being free of glassy and vitrified phases, being very porous and permeable to the extent that it sinks in water.

References Cited

UNITED STATES PATENTS

| 2,588,646 | 3/1952 | Miller et al. | 106—4 |
| 2,996,389 | 8/1961 | Fernhof | 106—4 |

JAMES E. POER, *Primary Examiner.*

U.S. Cl. X.R.

106—65